US008145726B1

(12) United States Patent
Roche et al.

(10) Patent No.: US 8,145,726 B1
(45) Date of Patent: Mar. 27, 2012

(54) METHOD AND APPARATUS FOR WEB RESOURCE VALIDATION

(75) Inventors: James C. Roche, Seattle, WA (US); Barry B. Hunter, Sammamish, WA (US); P. Grant Gavares, Seattle, WA (US); Thomas A. VanDeGrift, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1480 days.

(21) Appl. No.: 11/230,320

(22) Filed: Sep. 19, 2005

(51) Int. Cl.
*G06F 15/16* (2006.01)

(52) U.S. Cl. ........................................ 709/219

(58) Field of Classification Search .................... 709/219
See application file for complete search history.

(56) References Cited

U.S. PATENT DOCUMENTS

| | | | |
|---|---|---|---|
| 6,360,332 B1 * | 3/2002 | Weinberg et al. | 714/4.1 |
| 6,587,969 B1 * | 7/2003 | Weinberg et al. | 714/46 |
| 6,810,494 B2 * | 10/2004 | Weinberg et al. | 714/46 |
| 7,007,017 B2 | 2/2006 | Bergholz et al. | |
| 7,028,223 B1 * | 4/2006 | Kolawa et al. | 714/38.14 |
| 7,334,220 B2 * | 2/2008 | Chang et al. | 717/126 |
| 7,421,621 B1 * | 9/2008 | Zambrana | 714/38.14 |
| 7,433,835 B2 * | 10/2008 | Frederick et al. | 705/26 |
| 7,472,413 B1 * | 12/2008 | Mowshowitz | 726/10 |
| 7,496,658 B2 * | 2/2009 | Southam et al. | 709/224 |
| 7,529,733 B2 * | 5/2009 | Peterson et al. | 1/1 |
| 7,536,599 B2 * | 5/2009 | Paliwal et al. | 714/37 |
| 7,587,447 B2 * | 9/2009 | Ryman | 709/203 |
| 7,792,896 B2 * | 9/2010 | Cohen et al. | 709/201 |
| 7,797,400 B2 * | 9/2010 | Singh et al. | 709/219 |
| 7,886,188 B2 * | 2/2011 | Gorman et al. | 714/25 |
| 7,954,091 B2 * | 5/2011 | Li et al. | 717/135 |
| 8,006,140 B2 * | 8/2011 | Khanna | 714/45 |
| 2002/0087374 A1 * | 7/2002 | Boubez et al. | 705/7 |
| 2003/0074423 A1 * | 4/2003 | Mayberry et al. | 709/219 |
| 2004/0015865 A1 * | 1/2004 | Cirone et al. | 717/124 |
| 2004/0024841 A1 * | 2/2004 | Becker et al. | 709/219 |
| 2004/0093580 A1 * | 5/2004 | Carson et al. | 717/101 |
| 2004/0216127 A1 * | 10/2004 | Datta et al. | 719/313 |
| 2005/0021692 A1 * | 1/2005 | Adachi et al. | 709/220 |
| 2005/0198154 A1 * | 9/2005 | Xie et al. | 709/206 |

(Continued)

OTHER PUBLICATIONS

StrikeIron Web Services Analyzer for Windows, www.strikeiron.com, 2 pages.

(Continued)

*Primary Examiner* — Wing Chan
*Assistant Examiner* — Alicia Baturay
(74) *Attorney, Agent, or Firm* — Robert C. Kowert; Meyertons, Hood, Kivlin, Kowert & Goetzel, P.C.

(57) ABSTRACT

Method and apparatus for Web resource validation. Embodiments may provide a Web resource validation service for validating Web services and Web sites in general. Embodiments may be implemented internally in a Web entity's architecture and/or exposed externally as a Web service. In embodiments, a client configures a call to the Web service or Web site under test according to a Web resource validation service (WRVS) request schema that specifies validation requirements. The client then submits the WRVS request to the Web resource validation service. The Web resource validation service calls the Web service or Web site under test as specified in the WRVS request, and validates the response received from the Web service or Web site under test as specified in the WRVS request. Results of the validation are returned to the client formatted according to a WRVS response schema.

71 Claims, 6 Drawing Sheets

U.S. PATENT DOCUMENTS

| | | | | |
|---|---|---|---|---|
| 2005/0234680 A1* | 10/2005 | Dettinger et al. | ............. | 702/182 |
| 2006/0029054 A1* | 2/2006 | Breh et al. | ................... | 370/385 |
| 2006/0064468 A1* | 3/2006 | Brown et al. | ................. | 709/217 |
| 2006/0265475 A9* | 11/2006 | Mayberry et al. | ............ | 709/219 |

OTHER PUBLICATIONS

StrikeIron Web Services Analyzer for Windows, http://www.strikeiron.com/htmls/analyzer_win.aspx, Copyright 2003-2005, 3 pages.

StrikeIron Standard Services, http://www.strikeiron.comhtmls/standard_services.aspx, Copyright 2003-2005, 4 pages.

StrikeIron Web Services Business Network Quick Start Guide Using Standard Services, May 2004, 12 pages.

Narayanan, "Analysis and Simulation Using Web Services,", 2002, 16 pages.

Userland SOAP 1.1 Validator Web App, Feb. 2, 2001, 1 page.

David Berlin, "Who will test your Web service clients?", http://www.uk.builder.com/architecture/web/0,39026570,20267248,00.htm, Aug. 9, 2002, 2 pages.

WebServices.org "Eclipse Unveils Web Services Tools,", http://www.webservices.org/ws/content/view/full/56578, Mar. 8, 2005, 4 pages.

Parasoft, SOAPtest Data Sheet, www.parasoft.com, Copyright 2004, 2 pages.

Parasoft, SOAPtest—SOAptest Product Overview, http://www.parasoft.com/jsp/products/home.jsp;jsessionid=baabrwyN7zETG?product=SOAP, Copyright 1996-2005.

Optimyz—WebServiceTester: The Complete Turnkey Web Services Testing Suite!, http://www.optimyz.com/servicetester.html, Printed May 13, 2005, 2 pages.

Narendra Patil and Shrikant Wagh, "Optimyz—WebService Tester Comprehensive Web Service Testing Solution", Copyright 2002, 14 pages.

Narendra Patil and Shrikant Wagh, "Automating Business Process & SOA Testing Using Optimyz Web Service Tester", Copyright, 2002, 14 pages.

Neil Davidson, "Web Service Training", http://www.reg-gate.com/dotnet/more/web_services_testing.htm, Printed May 13, 2005, 8 pages.

* cited by examiner

METHOD AND APPARATUS FOR WEB RESOURCE VALIDATION

BACKGROUND OF THE INVENTION

1. Field of the Invention

This invention relates to computer networks, and, more particularly, to the validation of Web resources such as Web content (data), Web applications, and Web services.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW", which is commonly referred to as "the Web". The Web may be defined as all the resources (e.g., Web pages and Web sites) and users on the Internet that use the Hypertext Transfer Protocol (HTTP) or variations thereof to access the resources. A Web site is a related collection of Web files that includes a beginning file called a home page. From the home page, the user may navigate to other Web pages on the Web site. A Web server program is a program that, using the client/server model and HTTP, serves the files that form the Web pages of a Web site to the Web users, whose computers contain HTTP client programs (e.g., Web browsers) that forward requests and display responses. A Web server program may host one or more Web sites.

Web Services

As described above, the conventional Web model allows users to access Web resources (e.g., applications, services, and data) via an HTTP client program, such as a Web browser. A technology referred to as Web services has been developed to provide programmatic access to Web resources. Web services may be used to provide Web software developers programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

FIG. 1 is a block diagram that illustrates an exemplary system configuration that provides a Web service interface, and shows the interaction between a Web service client and a Web service provider. In this example, a Web service interface 106 may be implemented on a server 130 coupled to Internet 100. This server 130 may be referred to as a "Web service provider". Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a "Web browser" interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120. Further, note that Web service client 124 may itself be another Web service.

To access an application, service or data provided by the Web service provider 130, Web service client 124 may send a request message to Web service interface 106 via Internet 100. This request message goes through the network and Internet infrastructures; through the Web service client 124's local network routers, switches, firewalls, etc., through the Internet backbone, to the Web service provider's local network, to Server 130, and then to Web service interface 106. Web service provider 130 may then process the request, for example by performing an indicated function(s) of application or service 108 or accessing indicated data in database 142. Web service interface 106 may then return results of the processing to the Web service client 124 in a response message via Internet 100, back through the local networks and Internet backbone.

Web Resource Validation

Web services, Web applications, and Web sites/Web pages that provide Web resources (applications, services, and/or data) on the Web may collectively be referred to as "Web entities." Web software developers or other Web users may desire or require the validation of various Web resources provided by Web entities in request/response loops. For example, a Web software developer may be developing or testing an application that accesses a Web service by sending requests to the Web service's API to obtain information about products in a Web site's product catalog in responses from the Web service's API. The Web software developer may desire to validate that the content and/or format of an actual response received from the Web service corresponds to expected values and/or format for a response to the request that generated the actual response.

Conventionally, testing a request/response loop in an application requires the tester to call the remote Web entity under test, receive a response to the call, and then perform one or more tests to validate specific fields against expected results. Making calls to a remote Web entity under test may require the tester to have specific knowledge of the specific protocol of an API of the Web entity under test. A tester may, over time, desire or be required to perform testing of a number of different Web entities, each of which may have a specific API, thus requiring the tester to learn the specific protocols of each Web entity tested.

A response to a call the remote Web entity under test may be returned in a document with XPath-parseable content (e.g., XML, HTML, any dynamic language whose output is XML/HTML, etc.). Thus, testing the response may require the tester to have XPath capabilities and knowledge to be able to parse and reference items out of the document. XPath is a language that describes a way to locate and process items in documents by using an addressing syntax based on a path through the document's logical structure or hierarchy. When working with XPath, the tester may have to call in additional modules, parse the document within the XPath framework, and use the nomenclature of the specific XPath framework. This may be a complex, multi-step process, and may involve high-level coding. Conventionally, the client would have to perform multiple, complex steps to get to that point once the raw response is received from the Web entity under test. Further, as is the case for making calls to the remote entity under test, testing responses received from a remote Web entity under test may require the tester to have specific knowledge of the specific protocol of an API of the Web entity under test.

SUMMARY

Various embodiments of a method and apparatus for Web resource validation are described. Embodiments may provide a mechanism for the testing and validation of Web services, Web applications, and/or for the validation of Web content on Web sites in general. Embodiments of this mechanism may be implemented as a Web service, and may be referred to herein as a Web resource validation service. Embodiments of the Web resource validation service may be implemented internally in a Web entity's architecture to support the internal testing and validation of the entity's Web services or other Web pages. Embodiments may also be exposed as a Web service that is generally available to users on the Web for the validation of Web services, Web applications, and Web sites in general.

Embodiments of the Web resource validation service serve as an intermediary between the client (tester) and the remote Web service, Web application, or Web site (which may collectively be referred to as "Web entities") under test. In embodiments, the client configures a call to the remote Web entity under test according to a Web resource validation service (WRVS) request schema that includes validation requirements. The client then submits the WRVS request to the Web resource validation service. The Web resource validation service calls the Web entity under test as specified in the WRVS request, and validates the response received from the Web entity under test as specified in the WRVS request. Results of the validation are returned to the client formatted according to a WRVS response schema. In one embodiment, the Web resource validation service may optionally return the full text of the response from the Web entity under test as specified in the WRVS request.

In some embodiments, the Web resource validation service may abstract XPath functionality from the client. For example, parsing of the response from the Web entity under test may be performed within the Web resource validation service, so all the client has to specify is the W3C XPath notation for generating WRVS requests according to a specified schema used by the Web resource validation service. Since the XPath functionality is handled by the Web resource validation service, the client does not have to support XPath functionality to be able to take advantage of XPath notation. The Web resource validation service performs validation of the specified fields and values and returns the WRVS response to the client including results of the validation according to a predefined schema, built into a parsed document within the framework of the Web resource validation service. The client may then reference any part of the WRVS response using simple XPath notation.

One embodiment may provide a mechanism via which the client may optionally request that additional information beyond or different information than the default is returned in the WRVS response. One embodiment may provide a Response Group field in the WRVS request schema that allows the client to optionally specify that the WRVS response is to include only the failed validation tests, only the validation tests that passed, or the full list of test results (passed as well as failed validation tests). In one embodiment, the Response Group field may allow the client to optionally specify that the complete remote service response(s) to the call(s) to the Web entity under test is to be returned in WRVS response (for example, in a CDATA tag).

In one embodiment, remote service responses may be cached to provide the ability to chain calls by 'inheriting' values from prior remote service requests. Inherited values may be used, for example, as input to a subsequent remote service request, and/or as an expected value for the validation of a next remote service response in a sequence. By caching at least one previous remote service response, the Web resource validation service allows parameter values as specified in the WRVS request and/or inherited parameter values from a previous remote service response to be used in a subsequent remote service request.

Figure 1:
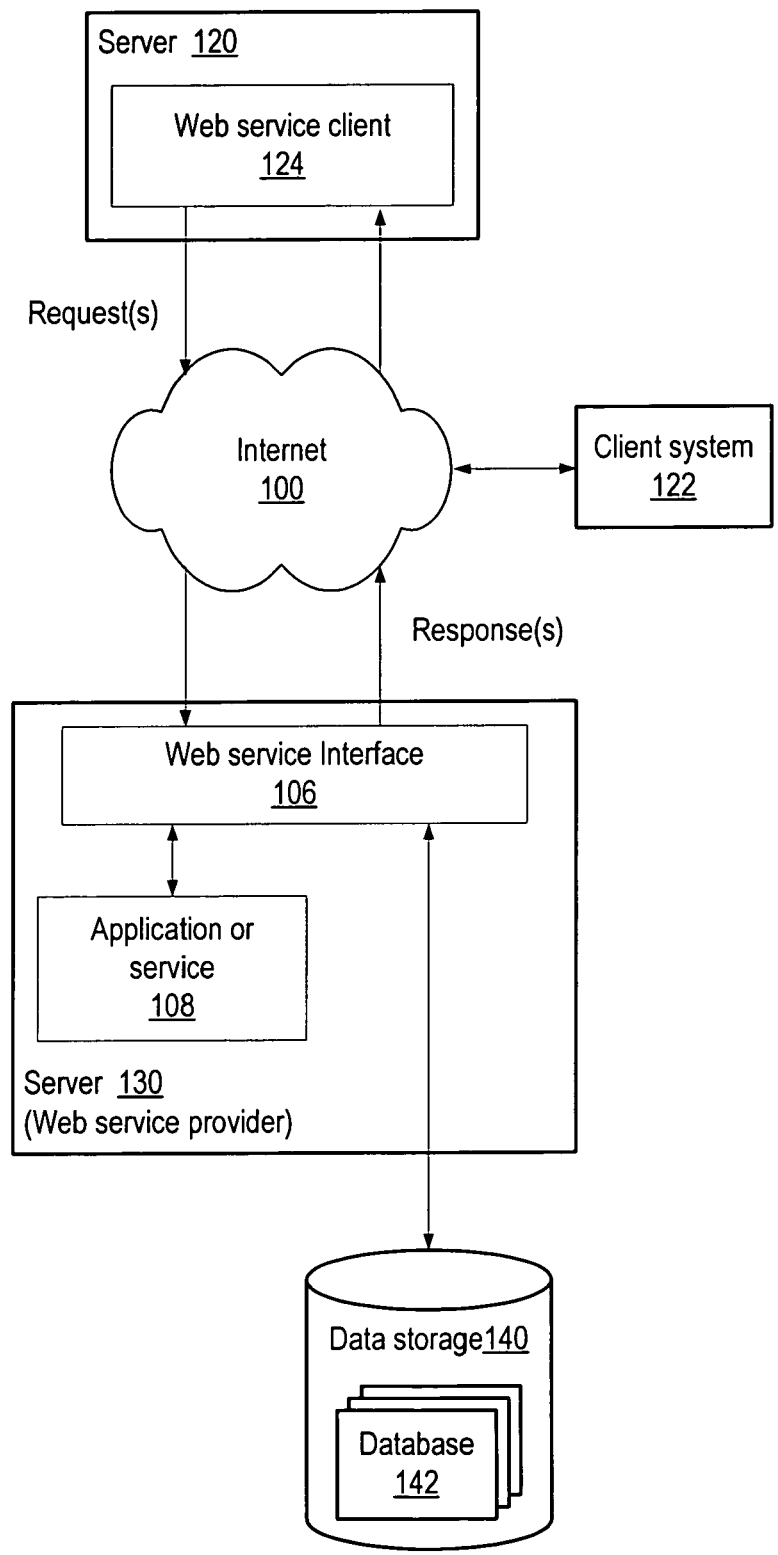
FIG. 1 is a block diagram that illustrates an exemplary system configuration that provides a Web service interface, and shows the interaction between a Web service client and Web service provider.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for Web resource validation are described. Embodiments may provide a mechanism for the testing and validation of Web services, Web applications, Web-hosted data, and, more generally, for the validation of Web content on Web sites in general. This mechanism may be referred to as a Web resource validation service. Embodiments may be implemented as a Web service that provides a Web service API that enables users to access the functionalities of the Web resource validation service.

Embodiments of the Web resource validation service may be implemented internally in a Web entity's architecture to support the internal testing and validation of the entity's Web services or other Web pages. Embodiments may, for example, enable the automation of Web services application testing from a variety of applications running in any location over a compatible Web service protocol. Embodiments of the Web resource validation service may also be provided as a Web service that is generally available to users on the Web for the validation of Web services and Web sites/Web pages in general.

Embodiments of the Web resource validation service may serve as an intermediary between the client (tester) and the remote Web service, Web application, or Web site (which may collectively be referred to as "Web entities") under test. In some embodiments, the client may configure a call to the remote Web entity under test as a Web resource validation service (WRVS) request in accordance with a WRVS request schema. The WRVS request may indicate tests to be performed on the Web entity under test and/or validation requirements to be applied to responses from the Web entity under test. The client then submits the WRVS request to the Web resource validation service. The Web resource validation service then calls the Web entity under test as specified in the WRVS request, and validates the response received from the Web entity under test according to the validation requirements specified in the WRVS request. Results of the validation may be returned to the client formatted according to a WRVS response schema. In one embodiment, the Web resource validation service may optionally return the full text of the response from the Web entity under test as specified in the WRVS request.

Note that, in some embodiments, a WRVS request from a client may or may not include validation requirements. In some embodiments, the validation requirements may be provided to the Web resource validation service in other WRVS requests, in other messages from the client than WRVS requests, and/or using one or more other mechanisms for providing validation requirements to the Web resource validation service. For example, in one embodiment, a client may send a series of WRVS requests to the Web resource validation service to test a Web entity. An initial WRVS request may include validation requirements for validating responses from the Web entity under test generated in response to a series of calls to the Web entity under test initiated in response to the series of WRVS requests. Thus, some of the series of WRVS requests may not include validation requirements.

Validations that may be performed as specified in a WRVS request to test and verify the content and/or performance of a Web entity under test may include one or more of, but are not limited to, validations of various performance aspects of a Web entity under test and its API (validating that the Web entity and its interface performs as expected and in a satisfactory manner), validations of the content of the Web entity under test, validations of response messages and content of the response messages received from a Web entity under test, and validations of a service description (e.g., an XML Schema Description (XSD)) of a Web entity under test. Validation requirements specified in an WRVS request, and the resulting validation of a response or responses from the Web entity under test, may include any test and/or validation that may be performed on responses from Web entity to verify the content, format, timing, latency, throughput, sequencing, size, or any other aspect or attribute of responses received from the API of the Web entity under test.

Validation may be performed to validate the content of the Web entity under test, and/or to validate any aspect of the performance of, interaction/communications with, and service description (e.g., the XSD) of the Web entity under test and its API. The following are examples of validations that may be performed on a Web entity under test and its API, the content of a Web entity under test, and response messages received from a Web entity under test, to test and verify the content and/or performance of the Web entity, and are not intended to be limiting. Validation may be performed to verify that two or more responses from the Web entity are received in an expected sequence. Validation may be performed to verify that an expected response message is received in response to a specified request message. Validation may be performed to verify the format of a response message conforms to an expected format. Validation may be performed to test for the presence or absence of specific fields in a response message. Validation may be performed to test that the values in specific fields of a response message conform to expected values for the fields as specified in the WRVS request. Validation may be performed to verify that a series of two or more responses include expected responses, that the responses are received in an expected order, and that the series of responses include expected and consistent content across the responses.

Responses from the Web entity under test may be formatted in accordance with a markup language, such as XML or HTML. Validation may be performed on a markup language document received as a response message to, for example, verify the tags, labels, formatting, and other aspects of the markup language document are as expected and correct. Validation may also be performed to verify the presence or absence of specified fields or tags in a markup language document. Other validations of the markup language document format may be performed.

Note that a wide range of logical, mathematical, Boolean, and other operations may be performed in the validation process of the content of responses from a Web entity under test. A WRVS request may include one or more logical expressions that may be applied to values in specific fields of a response or of two or more responses to verify if the values conform to the logical expressions. As examples of such expressions, values in a response message may be tested to verify that the values are greater than, less than, equal to, and/or not equal to one or more specified values, within or outside of a specified range of values, or whether the value is or is not included in a specified set or list of values.

Logical expressions may also be used to validate the content of two or more fields and/or to validate the content of one or more fields in two or more response messages. For example, a logical expression may be used to test "In response M, if field A's value is X, is field B's value Y?" In this example, if field A's value is X, and field B's value is Y, the validation process generates a "TRUE" response to the validation using the logical expression. In one embodiment, previous responses may be cached, and the content of a previous response may be applied in the validation process to the content of a subsequent response. For example, a logical expression may be used to test "If field A of response M1 contains the value X, does field B of response M2 contain the value Y?"

A WRVS request may include one or more regular expressions (a regular expression is commonly referred to as a "regex") that may be applied to the values in specific fields of a request to verify if the values match the regular expressions. A regular expression, or "regex", is a way of describing a string of characters (a "pattern"), and may use metacharacters, wild-card, and/or other symbols to represent portions of the string. Generally, a regular expression may match various strings. A specific format for regular expressions, including the set of symbols used in the regular expressions, may be considered a "pattern matching language". Thus, embodiments of the Web resource validation service may use one or more specific formats for regular expression to "match patterns" in the values of fields in response message during the validation process. As an example, and not intended to be limiting, a specified regular expression "A.*?9" may be used to validate if the value of a particular field begins with the letter A and ends with the number 9. As another example, a specified regular expression ".*?TWO.*?" may be used to validate if the value of a particular field includes the string "TWO". One skilled in the art will recognize the broad application that regular expressions may have in validating the content of fields, and of the broad range of regular expressions that are available to perform validation of various values in fields.

Note that "values" of fields that may be validated may be of any of various data types for numeric (e.g. integers, real numbers, floating points), textual, alphanumeric, or other computer-expressible data types.

In one embodiment, the validation of the Web entity under test, its content, and the response messages and content of the response messages received from the Web entity under test, may be dynamic. That is, the validation process may adjust or change in response to previous or current validation results. As a simple example, and not intended to be limiting, the validation process may only attempt to validate a value of a field B in a response message if a field A is present, or alternatively may only attempt to validate a value of a field B in a response message if field A is absent. As another example, the validation process may validate a value of a field B according to one validation test (e.g., against one specified value) if the value of a field A is determined to be set to one value, and may validate the value of field B according to a different validation test (e.g., against a different specified value) if the value of field A is determined to be set to a different value. As another example, the validation process may expect and test for the receipt of one particular response message if a previous message was a message of type A, and may expect and test for the receipt of a different response message if the previous message was of type B.

Embodiments of the Web resource validation service abstract XPath from the client (tester). Parsing of the response from the Web entity under test is performed within the Web resource validation service itself, so all the client has to know is the W3C XPath notation for generating WRVS requests according to a specified schema used by the Web resource validation service. The client does not have to implement XPath functionality itself. The Web resource validation service performs validation of the specified fields and values and returns a WRVS response to the client including results of the validation according to a predefined schema, built into a parsed document within the framework of the Web resource validation service. The client may then reference any part of the WRVS response using simple XPath notation.

Embodiments of the Web content validation service may perform as an intermediary service between testers and Web entities under test that formulates calls to, and parses and validates responses from, the APIs of various Web entities under test on behalf of the testers. Embodiments may provide a generic Web content and Web service request framework that manages the validation of responses from Web entities under tests on behalf of the testers, thus alleviating the testers of the need to code the possibly complex validations. Embodiments may alleviate the need to write a Web entity-specific test framework, and may, for example, enable the user to develop a client system that uses the Web content validation service as its core "backend" component for requests to a Web entity, for the validation of pre-formatted requests, and for the validation of responses from the Web entity.

Figure 2:
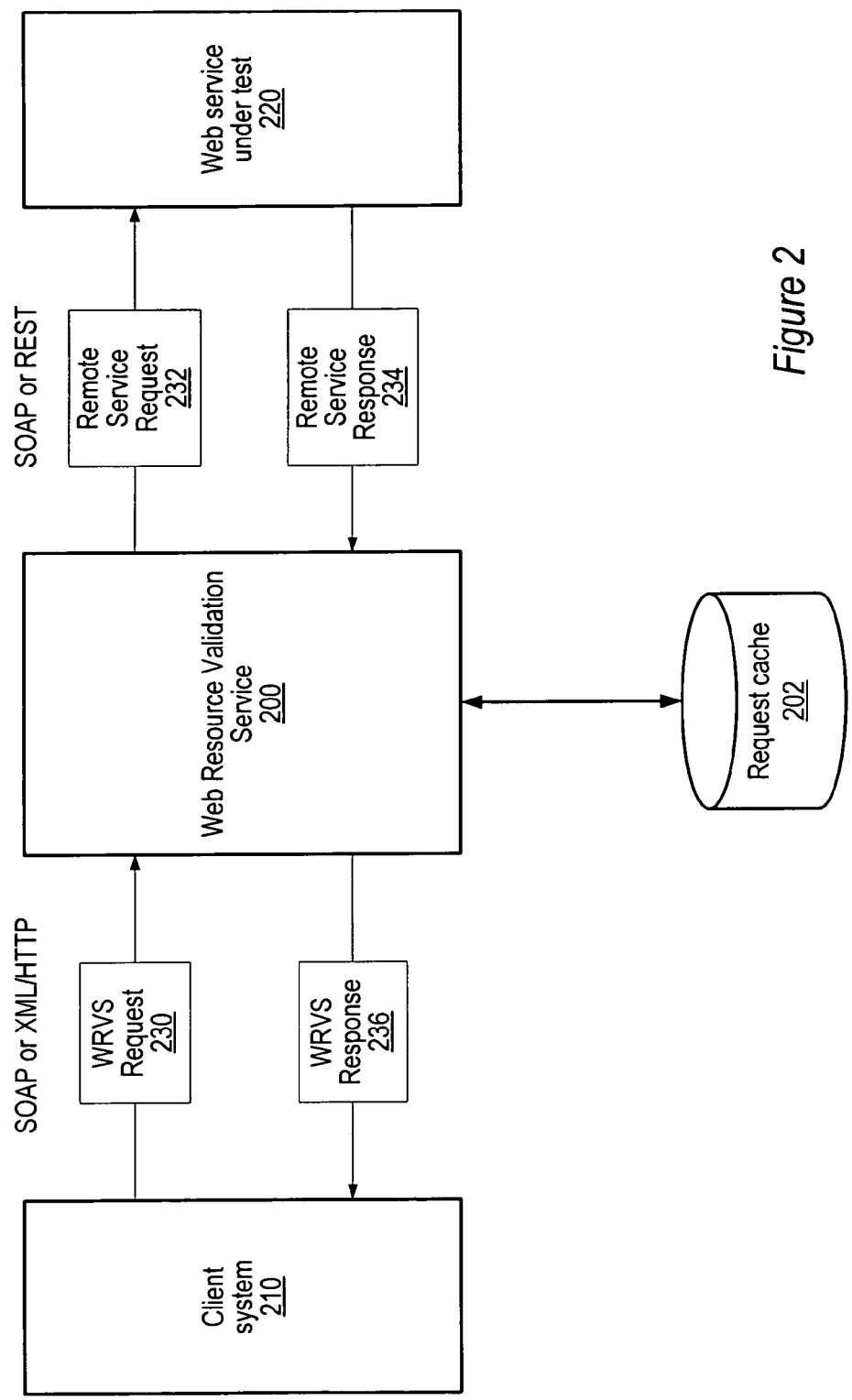
FIG. 2 illustrates an exemplary Web resource validation service that may be used by clients to validate an exemplary Web service, according to one embodiment.

FIG. 2 illustrates an exemplary Web resource validation service that may be used by clients to validate an exemplary Web service, according to one embodiment. Note that, while this example shows a Web service 220 under test, embodiments of the Web resource validation service 200 may be used to validate the content of types of Web sites and Web applications other than Web services.

A client of the of the Web resource validation service 200 composes a Web resource validation service (WRVS) request 230 which may specify, but is not limited to, one or more remote service requests, parameters for the requests, and one or more validation (test) requirements for remote service response(s) to the remote service request(s). The client may, for example, be a member of a Quality Assurance (QA) organization or a development team. The client may determine which fields/values in remote service responses 234 are to be validated in the test of the Web service 220, and may also determine what validation is to be performed on the field/values. As defined below, embodiments of the Web resource validation service 200 may be used to test remote service responses 234 for the presence or absence of a field in a remote service response 234, the exact expected value of a field in a remote service response 234, and/or a generalized expected value of a field in a remote service response 234 via a regular expression. A regular expression, or "regex", is a way of describing a string of characters (a "pattern"), and may use metacharacters, wild-card, and/or other symbols to represent portions of the string.

Once the tests are specified, the client may format the validations according to the schema of the Web resource validation service (WRVS) request 230. In embodiments, the WRVS request 230 may be composed as a markup language document. In one embodiment, eXtensible Markup Language (XML) may be used as the markup language. Information included by the client in the WRVS request 230 may include one or more of, but is not limited to: XML Schema Definition (XSD) of the Web service under test 220, the Web service under test 220 name and version, the input parameters for remote service requests to the Web service under test 220, and validation specifications for the individual field validations in remote service response(s) to the requests. In one embodiment, the validation data may not be required if the only desired test is schema validation. An exemplary WRVS request schema is further described later in this document.

Once the WRVS request 230 is generated, the client may then submit the WRVS request 230 to Web resource validation service 200 from client system 210 using a Web protocol. In one embodiment, either Simple Object Access Protocol (SOAP) or XML/HTTP protocol may be used to submit the WRVS request to the Web resource validation service 200. Other embodiments may use other protocols.

Once Web resource validation service 200 receives the WRVS request 230, the Web resource validation service 200 may initiate the set of tests as specified in the WRVS request 230 schema. In one embodiment, the configured tests may be processed sequentially, from top to bottom of the schema. Processing the configured tests sequentially may facilitate the inheritance of parameter values from one response 234 to a remote service request 232 for use as input values to a subsequent remote service request 232. In one embodiment, Web resource validation service 200 may perform service description (e.g., schema) validation (e.g., Web Services Description Language (WSDL) or XML schema validation) for remote service requests 232 as specified in the WRVS request 230.

Parameters for the specific remote service requests 232 as specified in the received WRVS request 230 may be parsed into the remote service requests 232 by Web resource validation service 200. Each call to Web service under test 220 specified within the WRVS request 230 is sent to the specified Web service 220 as a remote service request 232. In one embodiment, each remote service request 232 may be formatted in accordance with either Fully REpresentational State Transfer (REST) or Simple Object Access Protocol (SOAP) based on the test configuration. Other embodiments may support other protocols.

A remote service response 234 is returned to Web resource validation service 200 from the Web service under test 220 in response to a remote service request 232. Remote service responses 234 to the remote service requests 232 may then be validated by Web resource validation service 200. Web resource validation service 200 may examine each remote service response 234 for compliance with validation requirements as specified in the WRVS request 230. During validation of the remote service response 234, validation requirements as specified in the WRVS request 230 may be checked against the actual fields and values in the received remote service response 234. Alternatively, or in addition, service description (e.g., schema) validation (e.g., WSDL or XML schema validation) of the remote service response 234 may be performed by Web resource validation service 200 as indicated by the validation requirements as specified by the WRVS request 230. In one embodiment, the WRVS request 230 may include expected service descriptions (e.g., schema definitions) for the remote service responses 234 which may be used in validating the remote service response(s) 234. Note that, in one embodiment, if schema (e.g., XML Schema Definition (XSD)) problems are encountered when validating the schema of a remote service response 234, none of the other validations as specified by the WRVS request 230 for the remote service response 234 may be performed. XML Schema Definition (XSD) specifies how to formally describe the elements in an XML document. This description may be used to verify that each item of content in a document adheres to the description of the element in which the content is to be placed.

In one embodiment, a remote service request 232 to the Web service under test 220 may request that the Web service under test 220 return a service description for the Web service under test (e.g., a WSDL schema) in a remote service response 234. The Web resource validation service 200 may then validate the returned service description against an expected service description provided to the Web resource validation service 200 in the WRVS request 230 received from the client system 210.

In one embodiment, XPath may be used to parse the remote service response 234 to locate fields and values of the fields for validation. In one embodiment, WRVS request 230 schema may include a field for the client to specify a validation type for fields/values in a remote service response 234. Each validation type may yield a different set of tests. In one embodiment, a validation type of 'Exact' will require the field value to be precisely the same as the expected value. In one embodiment, a validation type of 'Regex' will require the field value to match a specified regular expression. In one embodiment, a validation type of 'Populated' will require the field to have data, and a validation type of 'NotPopulated' will require the field to not have data. In one embodiment, a validation type of 'Exists' requires the field to be present, and a validation type of 'NotExists' requires the field to be absent.

Note that the values ('Exact', 'Regex', etc.) used to specify the validation types are exemplary, and other values may be used. Also note that some embodiments may allow other validation types to be specified to perform different tests on fields and values than those described.

Information on validation failures and/or successes may be serialized into a Web resource validation service (WRVS) response 236. In embodiments, the WRVS response 236 may be composed as a markup language schema. In one embodiment, eXtensible Markup Language (XML) may be used as the markup language. WRVS Response 236 schema (e.g., XML) may be used to define specific tests that failed and/or passed. In one embodiment, WRVS response 236 may include the data requested for the tests along with the test (validation) results. An exemplary WRVS response schema is further described later in this document.

After completion of the tests as specified in the WRVS request 230, the completed WRVS response 236 may be returned to the client system 210. In one embodiment, WRVS response 236, by default, includes only information for the validation tests that failed. In another embodiment, WRVS response 236, by default, includes information for the validation tests that passed as well as the validation tests that failed. In one embodiment, the WRVS response 236 includes the Web service under test 220 name and the input parameters from the WRVS request 230, along with the XPath, expected value, and returned value for each validation test that failed and/or passed.

One embodiment may provide a mechanism via which the client may optionally request that additional information beyond or different information than the default is returned in the WRVS response 236. One embodiment may provide a Response Group field in the WRVS request 230 schema that allows the client to optionally specify that the WRVS response 236 is to include only the failed validation tests, only the validation tests that passed, or the full list of test results (passed as well as failed validation tests). In one embodiment, the Response Group field may allow the client to optionally specify that the complete remote service response(s) to the call(s) to the Web service under test 220 are to be returned in WRVS response 236 (for example, in a CDATA tag). Thus, the Response Group field may permit the optional inclusion of the complete remote service response(s) 234 in the validation results (WRVS response 236), which may, for example, be used for identification of issues via XSL.

In one embodiment Web resource validation service 200 may record and include latency information in WRVS response 236. Latency information may include the round-trip time of the WRVS request 230 to Web resource validation service 200, and/or the round-trip time of the call (request and response) to Web service under test 220 from Web resource validation service 200 (the time between the sending of the request to the Web service under test and the receipt of the response from the Web service under test). In one embodiment, latency information may also include processing latency for the request by the Web service under test (the time between the receipt of the request by the Web service under test and the sending of the response by the Web service under test).

Recording and including latency information in WRVS response 236 may enable a variety of latency analyses using Web resource validation service 200. For example, the tester may wish to statistically analyze the latency (e.g., to determine mean, median, mode, standard deviation, etc) for calls to the Web service under test 220. The tester may send a series of WRVS requests 230 to the Web resource validation service 200 over a period specifying different requests to be sent to the Web service under test 220. Once a statistically significant number of requests and responses have been performed, the tester may collect and statistically analyze latency information included in the WRVS responses to the WRVS requests. This statistical information on latency of the Web service under test 220 may be used to determine if the Web service under test 220 performs in a manner that is satisfactory to the requirements of the tester. Note that similar latency analysis may be used to test the performance of specific types of calls to the Web service under test 220, of a specific series or set of calls to the Web entity under test 220, to test the latency of the Web service under test 220 during particular periods of the day, week, or month, and so on. Latency analysis may also be used to test the network latency when calling the Web entity under test 220. Note that the network latency is the difference between the round-trip time of a call (request and response) to Web service under test 220 from Web resource validation service 200 and processing latency for the request by the Web service under test 220.

On client system 210, the WRVS response 236 may be parsed to determine the results of the test. In one embodiment, XPath may be used on the client system to parse the WRVS response 236.

In one embodiment, at least one most recent remote service response 234 may be cached to a Request Cache 202 to allow the data therein to be sourced for subsequent remote service requests 232 and/or remote service response 234 validation. Remote service responses 236 may be cached to provide the ability to chain calls by 'inheriting' values from prior remote service requests 232. Inherited values may be used, for example, as input to a subsequent remote service request 232, and/or as an expected value or a value to be tested against for the validation of a next remote service response 234 in a sequence. Validation of a value in a subsequent response using a value (or values) in a cached previous response may be performed with any logical expression used to validate a value against an expected value or values as specified in the WRVS request. For example, two values may be tested for equality, inequality, to see if one is greater than or less than the other, to see if one value includes a string also found in the other value (using a regular expression, or "regex"). As another example, a value in a subsequent response may be tested to see if the value lies within a range specified by two values from a cached response. As yet another example, a value from a cached response may be added to (or subtracted from) a value in a subsequent response, and the results may be compared to an expected value specified in the WRVS request, or to another value in one of the two responses, or in yet another subsequent response or cached response. The above examples are not intended to be limiting. One skilled in the art will recognize that any of various mathematical, logical, Boolean, or other operations may be performed on one, two or more values from one or more response message during the validation process.

By caching at least one previous remote service response 234 in Request Cache 202, Web resource validation service 200 allows parameter values as specified in the WRVS request 230 and/or inherited parameter values from a previous remote service response 234 to be used in a subsequent remote service request 232. In one embodiment, a remote service response 234 may be cached for a limited time, for example two minutes, after which inheritance from the remote service response 234 will not be supported.

In one embodiment, remote service request 232 specification in WRVS request 230 may provide a 'Sequence' field for the remote service request 232 that identifies the remote service response 234 to the request as eligible for individual field inheritance by the next remote service request 232 in a sequence and/or by a next set of tests specified in WRVS request 230. In one embodiment, a remote service response 234 eligible for inheritance replaces the last remote service response 234 cached for a current sequence.

Figure 3:
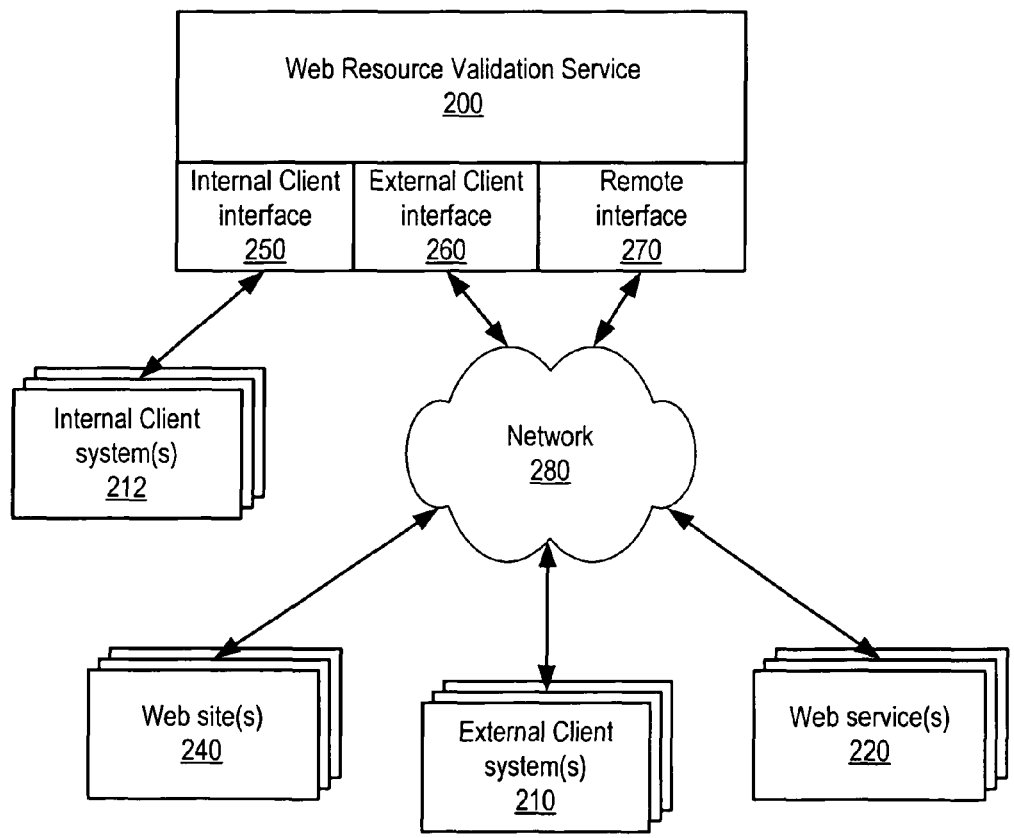
FIG. 3 illustrates a Web resource validation service in a networked environment according to one embodiment.

FIG. 3 illustrates a Web resource validation service in a networked environment according to one embodiment. In one embodiment, the Web resource validation service 200 may be implemented as a Web service that exposes one or more interfaces, or APIs, that enable users to access the functionalities of the Web resource validation service 200. Embodiments of the Web resource validation service 200 may implement an internal client interface 250 that enables processes executing on internal client systems 212, for example on a Web entity's internal network (e.g., a Local Area Network (LAN)), and/or processes executing on a system hosting Web resource validation service 200 to access the functionalities of the Web resource validation service 200 to perform testing and validation of the Web services 220 and/or Web sites 240. Embodiments of the Web resource validation service 200 may also or alternatively be exposed via an external client interface 260 (e.g., a Web service API) on network 280 as a service that is generally available to processes executing on external client systems 210 (e.g., on the Internet) for the validation of Web services 220 and other Web sites 240 on network 280. In some embodiments, internal clients that are also connected to network 280 may access Web resource validation service 200 through external client interface 260. Note that processes executing on external client systems 210 and processes executing on internal client systems 212 that may access Web resource validation service 200 through an internal client interface 250 or external client interface 260 may themselves be Web services or other types of applications.

Web resource validation service 200 also includes a remote interface 270 through which the Web resource validation service 200 communicates with (e.g., sends remote service requests to and receives remote service responses from) Web entities under test (Web site(s) 240 and Web service(s) 220).

Figure 4:
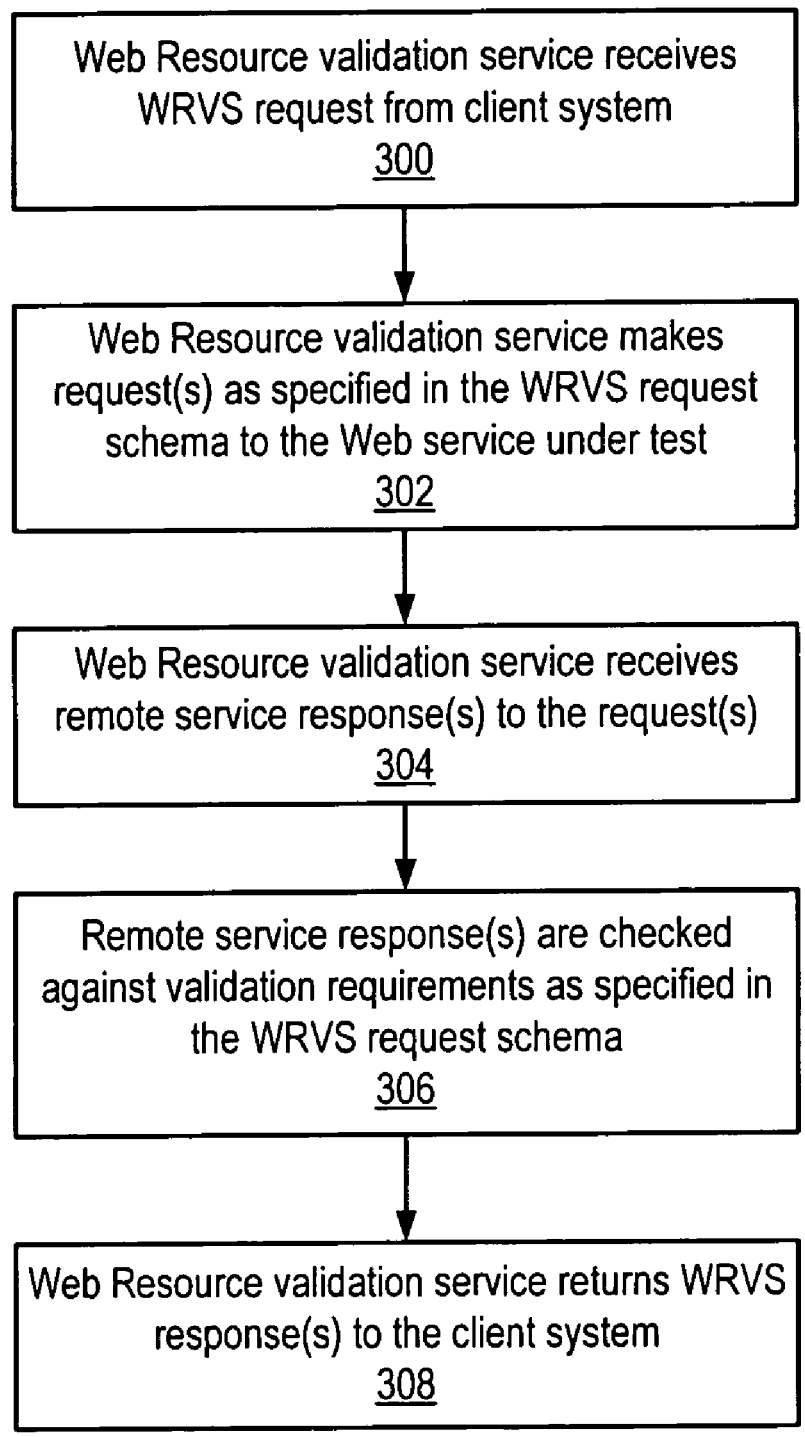
FIG. 4 is a flowchart of a method of operation for a Web resource validation service according to one embodiment.

FIG. 4 is a flowchart of a method of operation for a Web resource validation service according to one embodiment. Note that, while this flowchart describes the Web resource validation service as being used to validate content of a Web service, embodiments of the Web resource validation service may be used to validate content of other types of Web sites and Web applications than Web services.

As indicated at 300, the Web resource validation service receives a Web resource validation service (WRVS) request from a client system. The WRVS request may be formatted in accordance with a Web resource validation service request schema, and may include, but is not limited to, one or more remote service parameters and one or more validation (test) requirements. In embodiments, the WRVS request may be composed as a markup language document. In one embodiment, eXtensible Markup Language (XML) may be used as the markup language. An exemplary WRVS request schema is described later in this document.

As indicated at 302, the Web resource validation service makes the remote service requests(s) as specified in the WRVS request schema to the Web service specified in the WRVS request schema as the Web service under test. The Web resource validation service parses the WRVS request to extract the information indicating the Web service under test and the information to compose the remote service request(s). In one embodiment, the WRVS request is an XML document, and the Web resource validation service may use XPath to parse the document. The Web resource validation service then sends the remote service request(s) to the specified Web service under test. In one embodiment, each remote service request may be formatted in accordance with either Fully REpresentational State Transfer (REST) or Simple Object Access Protocol (SOAP) based on the test configuration. Other embodiments may support other protocols.

As indicated at 304, one or more remote service responses to the remote service request(s) are received by the Web resource validation service. As indicated at 306, the remote service response(s) to the remote service request(s) may then be validated by Web resource validation service. To validate the remote service response(s), content of the remote service response(s) may be checked against the validation requirements as specified in the WRVS request schema. Validation requirements as specified in the WRVS request may be checked against the actual fields and values in the received remote service response. Note that a wide range of logical, mathematical, Boolean, and other operations may be performed in the validation process of the content of remote service response(s), that validation of the content of remote service response(s) was previously described herein, and that various examples of validating content of response messages and the messages themselves were provided.

In one embodiment, XPath may be used to parse the remote service response to locate fields and values of fields for validation. In one embodiment, WRVS request schema may include a field for the client to specify a validation type for fields/values in a remote service response. Each validation type may yield a different set of tests. In one embodiment, a validation type of 'Exact' will require the field value to be precisely the same as the expected value. In one embodiment, a validation type of 'Regex' will require the field value to match a specified regular expression. A regular expression, or "regex", is a way of describing a string of characters (a "pattern"), and may use metacharacters, wild-card, and/or other symbols to represent portions of the string. In one embodiment, a validation type of 'Populated' will require the field to have data, and a validation type of 'NotPopulated' will require the field to not have data. In one embodiment, a validation type of 'Exists' requires the field to be present, and a validation type of 'NotExists' requires the field to be absent. Note that the values ('Exact', 'Regex', etc.) used to specify the validation types are exemplary, and other values may be used. Also note that some embodiments may allow other validation types to be specified to perform different tests on fields and values than those described.

As indicated at 308, the Web resource validation service may compose a WRVS response and return the WRVS response to the client system. Information on validation failures and/or successes may be serialized into the WRVS response. In embodiments, the WRVS response may be composed as a markup language schema. In one embodiment, XML may be used as the markup language. The WRVS Response schema may be used to define specific tests that failed and/or passed. In one embodiment, the WRVS response may include the data requested for the tests along with the test (validation) results. In one embodiment, the WRVS response, by default, includes only information for the validation tests that failed. In another embodiment, the WRVS response, by default, includes information for the validation tests that passed as well as the validation tests that failed. In one embodiment, the WRVS response includes the Web service under test name and the input parameters from the WRVS request, along with the XPath, expected value, and returned value for each validation test that failed and/or passed. An exemplary WRVS response schema is further described later in this document.

One embodiment may provide a mechanism via which the client may optionally request that additional information beyond or different information than the default is returned in the WRVS response. One embodiment may provide a Response Group field in the WRVS request schema that allows the client to optionally specify that the WRVS response is to include only the failed validation tests, only the validation tests that passed, or the full list of test results (passed as well as failed validation tests). In one embodiment, the Response Group field may allow the client to optionally specify that the complete remote service response(s) to the call(s) to the Web service under test are to be returned in the WRVS response (for example, in a CDATA tag). Thus, the Response Group field may permit the optional inclusion of the complete remote service response(s) in the WRVS response.

The completed WRVS response may be returned to the client system. On the client system, the WRVS response may be parsed to determine the results of the test. In one embodiment, XPath may be used on the client system to parse the WRVS response.

Figure 5:
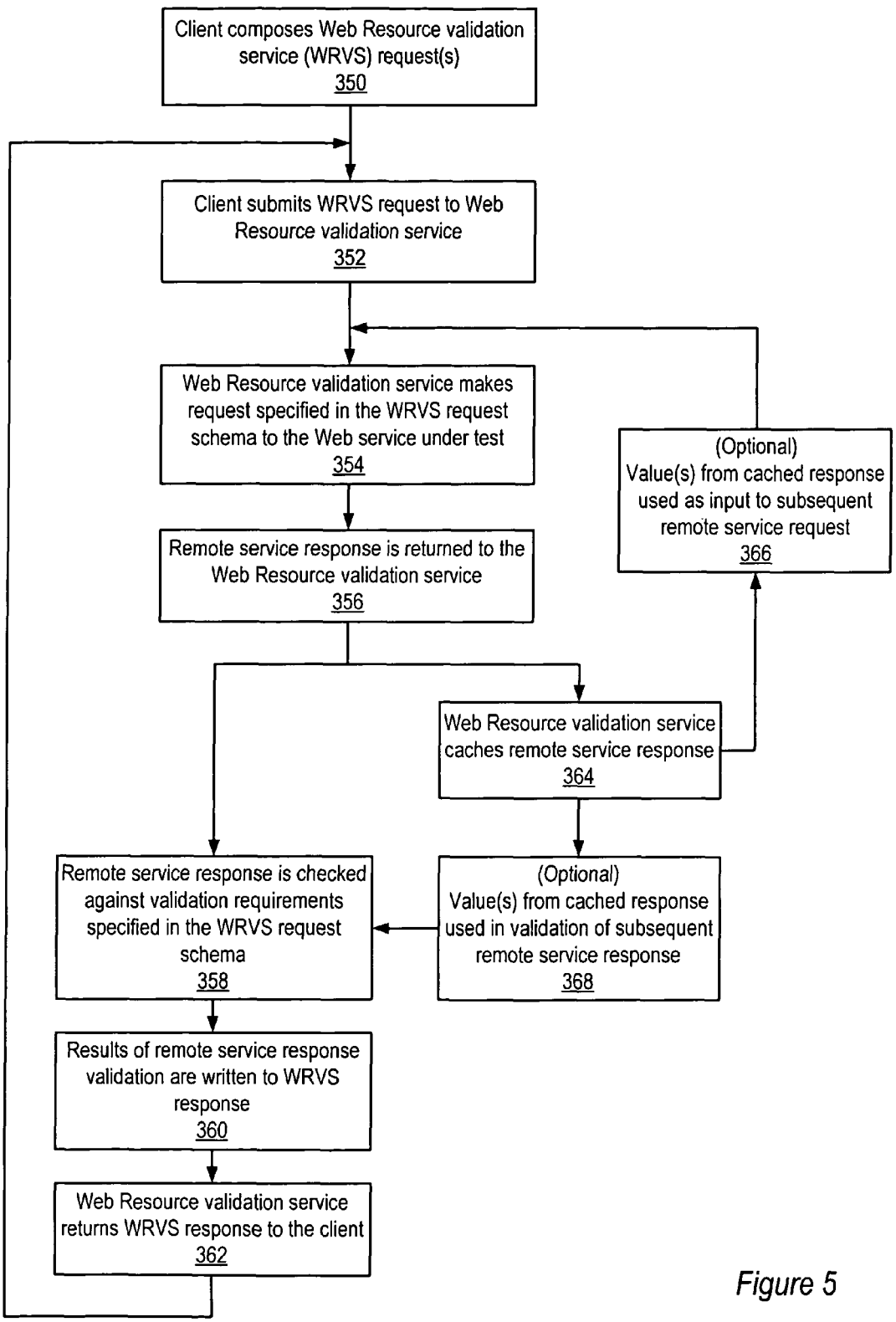
FIG. 5 is a flowchart of a method of operation for a Web resource validation service including the caching of remote service responses, according to one embodiment.

FIG. 5 is a flowchart of a method of operation for a Web resource validation service including the caching of remote service responses, according to one embodiment. In one embodiment, one or more values from a cached remote service response may be used as input to a subsequent remote service request and/or in the validation of a subsequent remote service response as specified in the WRVS request. Note that, while this flowchart describes the Web resource validation service as being used to validate content of a Web service, embodiments of the Web resource validation service may be used to validate content of other types of Web sites and Web applications than Web services.

As indicated at 350, a client composes a Web resource validation service (WRVS) request. The WRVS request may include, but is not limited to, one or more remote service parameters and one or more validation (test) requirements. The client may determine which fields/values in remote service response(s) are to be validated in the test of the Web service, and may determine what validation is to be performed on the field/values. In one embodiment, the Web resource validation service may be used to test remote service responses for the presence or absence of a field, the exact expected value of a field, and/or a generalized expected value of a field via a regular expression.

Once the tests are specified, the client may format the validations according to the schema of the Web resource validation service (WRVS) request. In embodiments, the WRVS request may be composed as a markup language document. In one embodiment, eXtensible Markup Language (XML) may be used as the markup language. In one embodiment, the WRVS request may include one or more of, but is not limited to: XML Schema Definition (XSD) of the Web service under test, the Web service under test name and version, the input parameters for the Web service under test, and validation information for individual field validations. In one embodiment, the validation data may not be required if the only desired test is schema validation. An exemplary WRVS request schema is further described later in this document.

As indicated at 352, once the WRVS request is generated, the client may submit the WRVS request to the Web resource validation service from a client system using a Web protocol. In one embodiment, either Simple Object Access Protocol (SOAP) or XML/HTTP protocol may be used. Other embodiments may use other protocols.

As indicated at 354, the Web resource validation service makes the remote service requests as specified in the WRVS request schema to the Web service specified in the WRVS request schema as the Web service under test. The Web resource validation service parses the WRVS request to extract the information indicating the Web service under test and the information to compose the remote service request. The Web resource validation service then sends the remote service request to the specified Web service under test. In one embodiment, each remote service request may be formatted in accordance with either Fully REpresentational State Transfer (REST) or Simple Object Access Protocol (SOAP) based on the test configuration. Other embodiments may support other protocols.

As indicated at 356, a remote service response to the remote service request may be received by the Web resource validation service. As indicated at 358, the remote service response to the remote service request may then be validated by Web resource validation service. To validate the remote service response, content of the remote service response is checked against the validation requirements as specified in the WRVS request schema. Validation requirements as specified in the WRVS request may be checked against the actual fields and values in the received remote service response.

As indicated at 360, the Web resource validation service may compose a WRVS response. Information on validation failures and/or successes may be serialized into the WRVS response. In embodiments, the WRVS response may be composed as a markup language schema. In one embodiment, XML may be used as the markup language. The WRVS Response schema may be used to define specific tests that failed and/or passed. In one embodiment, the WRVS response may include the data requested for the tests along with the test (validation) results. An exemplary WRVS response schema is further described later in this document. As indicated at 362, the completed WRVS response may be returned to the client system. On the client system, the WRVS response may be parsed to determine the results of the test. In one embodiment, XPath may be used on the client system to parse the WRVS response.

In one embodiment, the received remote service response may be cached by the Web resource validation service, as indicated at 364. Content of the cached remote service response may be used as input to a subsequent remote service request, as indicated at 366, and/or may be used in the validation of a subsequent remote service response, as indicated at 368. In one embodiment, the WRVS request schema may include a mechanism through which the client may specify that a value to be input to a remote service request is to be obtained from a previously cached remote service response. In one embodiment, the WRVS request schema may include a mechanism through which the client may specify that a value to be used in the validation of a remote service response is to be obtained from a previously cached remote service response. The exemplary WRVS request schema described below describes an exemplary mechanism through which the client may specify the source for values used in both input to a remote service request and input to the validation process for a remote service response.

WRVS Request Schema

The following is a description of elements in an exemplary WRVS request 230 schema that may be used in one embodiment of the Web resource validation service. Note that this description is exemplary, and is not intended to be limiting. Other embodiments may include other schema elements, and/or may not include one or more of the schema elements described herein. Also note that the element names are exemplary, and other names may be used to refer to the elements. In one embodiment, errors may be returned for missing or unacceptable value in any of these fields.

Response Groups

The Response Groups schema element may be used to specify what is to be returned in the WRVS response. In one embodiment, values for this element may include one or more of, but are not limited to:

EchoResponse—Returns full text of remote service response(s) in a CDATA tag

PassOnly—Only return test results for validation tests that pass

FailOnly—Only return test results for validation tests that fail

PassFail—Return both successful and failed validation test results

Subscription ID

In one embodiment, a subscription ID may be required for each remote service request. The subscription ID may be used by the Web resource validation service 230 to index remote service responses for caching/inheritance.

Operation

In one embodiment, this element may be required for each remote service request. This element is used to define the operation to be performed on the remote service response. In one embodiment, the value for this element may be "validate", to specify that the remote service response is to be validated as described herein. Note that other embodiments may use this element to specify other operations. In one embodiment, for example, values of "XMLValidate" and "HTMLValidate" may be used to specify a specific type of validation to be performed.

Configuration

In one embodiment, this element may be required for each remote service request. The configuration element may be a complex type that may include the fields:

Protocol—In one embodiment, accepted values are REST or SOAP. Used to specify whether the request will be processed in the REST or SOAP protocol. Other embodiments may accept other values to specify other protocols, e.g. HTTPGET and HTTPPOST.

Request Path—The specified Request Path that will be used to make the call to the Web service/site to be tested. In one embodiment, content checking may be performed to ensure a valid path.

Tests/Test

In one embodiment, this element may be required for each remote service request. The test/tests element may be a complex type that may include the fields:

Service Name—name of the Web service under test (or, in one embodiment, optionally, a Web site under test).

Version—May be used to retrieve version-specific release of schema for Web services.

Input Fields/Input Field—a complex type that may include the following elements:

Input Parameter. Required for each Input Field.

Input Source—Acceptable values may include:

Service Call: source of input is explicit to this request

Inherited: input is sourced from the last cached call

In one embodiment, the Input Source defaults to Service Call when this field is not specified.

Input Value—Required for each Input Field. When Input Source=Service Call, the Input Value may be the actual parameter value. When Input Source=Inherited, the Input Value may be an XPath pointing to a value in the last (cached) call.

Validation—In one embodiment, this field is optional, and absence of the Validation field implies that the tester only wants schema (e.g., WSDL schema) validation performed. In one embodiment, this field is a complex type that may include the following elements:
  XPath Field—XPath Field defines which field in the response is to be tested, using XPath notation.
  Validation Style—Required for each Validation. Validation requires the value to fall into accepted values. Acceptable values for this field may include, but are not limited to:
    Exact: Value in Validation Value matches value in XPath Field exactly.
    Regex: Value in Validation Value matches value in XPath Field according to a specified regular expression.
    Populated: Value specified in XPath Field is present and populated.
    NotPopulated: Value specified in XPath Field is present but not populated
    Exists: Value specified in XPath Field is present
    NotExists: Value specified in XPath Field is not present
  Validation Style requires the presence of Validation Value when either Exact or Regex are specified.
  Validation Value—This field may be required based on the value of Validation Type. No Validation Value is required when Validation Type is Populated or NotPresent. Validation Value is ignored if specified in this case. Validation Value is required when Validation Type is Exact or Regex. This may be a complex type, whose member elements may include:
    Value—Required for each Validation Value.
    Source—May be optional. Source requires value to fall into accepted values. Accepted values for Source may include:
      ServiceCall: Value is explicitly referenced in the Value field.
      Inherited: Value is sourced from the cached last call, at the XPath specified in the Value field.
    In one embodiment, Source defaults to ServiceCall.

WRVS Response Schema

The following is a description of elements in an exemplary WRVS response 236 schema that may be used in one embodiment of the Web resource validation service. Note that this description is exemplary, and is not intended to be limiting. Other embodiments may include other schema elements, and/or may not include one or more of the schema elements described herein. Also note that the element names are exemplary, and other names may be used to refer to the elements.

Test Results/Test Result

Test Results/Test Result may be a complex type, and may include, but is not limited to, the following member elements:
  Echo Response—Full response from the remote service request. May be encased in a <![CDATA[ . . . ]]> tag to preserve the tagging of the response. In one embodiment, the SOAP envelope may be stripped out of the response before returning, to maintain consistency between REST and SOAP. In one embodiment, the XML header may be retained (e.g., <?xml version="1.0" encoding="UTF-8"?>) so that the client may parse the results without backfilling the value.
  Result Array—Return either Pass or Fail. Pass indicates successful match to the expected response. Fail indicates failed match to the expected response.
  Validation Field—Echoes back the Validation Field value from the request.
  Validation Style—echoes back the Validation Style value from the request.
  Expected Value—When the Expected Value in the request has a Source value of ServiceCall by explicit specification or by default, echo back the value given in the request for Validation Value/Value. When the Validation Value in the request has a Source value of Inherited, insert the value, rather than the XPath reference specified in the request, into the Validation Value for this response.
  Actual Value—Value returned at the location specified in the XPath Field as part of the Validation.

Exemplary System

Figure 6:
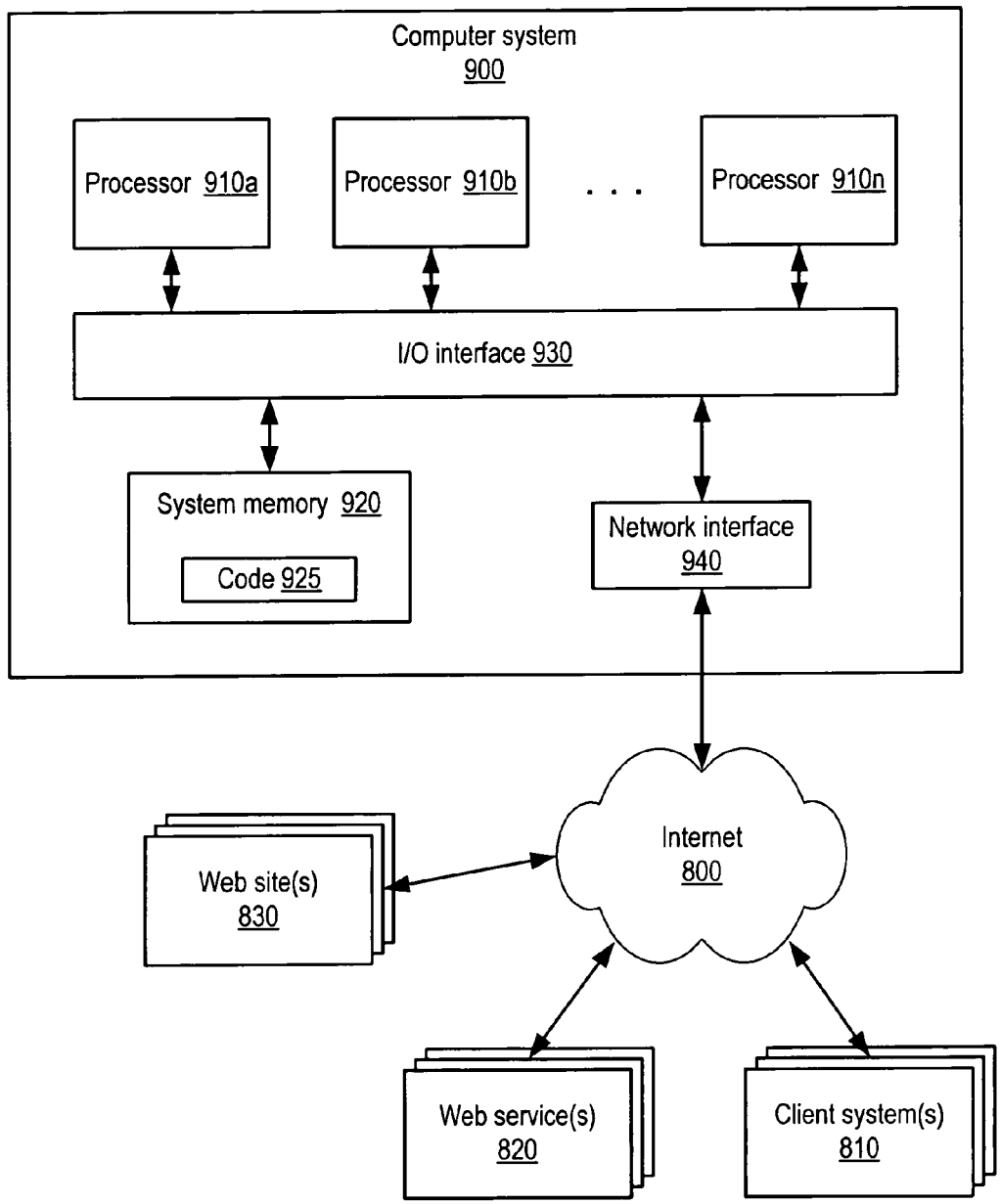
FIG. 6 is a block diagram illustrating an exemplary embodiment of a computer system on which embodiments may be implemented.

In one embodiment, a Web server that implements one or more components of a Web resource validation service as described herein may include a general-purpose computer system that includes or is configured to access one or more computer-accessible media, such as computer system 900 illustrated in FIG. 6. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a Web resource validation service, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer systems hosting Web services 820, Web sites 830, and clients 810 on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for implementing one or more components of a Web resource validation service as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Exemplary Web Services

Embodiments of the Web resource validation service as described herein may be used to validate any type of Web service, Web site, or Web application. The following describes some types of Web services as examples of Web services for which embodiments of the Web resource validation service may be used to validate content.

Some Web service providers may provide Web service interfaces to collections of data, such as product catalogs, through which Web service clients may access the data to be used, for example, on Web sites provided by the Web service clients. The Web service interface may provide APIs to search, retrieve, and potentially even update the Web service provider's data. For example, a Web service client may access product information in a product catalog through a Web services interface, and display links to or advertisements for those products for sale through the Web service client's Web site. The Web service provider may, for example, pay a commission to the Web service client for each item sold.

Another exemplary Web service is a queue Web service. In this Web service, a Web service provider may provide a Web service interface to an application that may allow Web service clients to create queues and to store data in and retrieve data from elements of the queues. The queues may be accessed and shared by two or more Web service clients, allowing the clients to store and/or exchange data via the Web service.

As an example, a queue Web service may be used to decouple components of an application so that the components may run independently, with the queue Web service easing messaging management between the components. Any component of a distributed application may store any type of data in a queue. Any other component or application may then later retrieve the data, using queue semantics. The queue may serve as a buffer between a work-producer that is saving the data, and a work-consumer that is retrieving the data for processing. Thus, the queue Web service may resolve issues that would otherwise arise if the producer were producing work faster than the consumer can process the work, or if the producer or consumer were only intermittently connected to the network.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a processor; and
a memory comprising program instructions, wherein the program instructions are executable by the processor to implement a Web resource validation service configured to:
receive a request from a client system, wherein the request is formatted in accordance with a request schema for requests to the Web resource validation service;
in response to the request from the client system:
send, via a network, a remote service request specified by the request to a remote Web entity under test specified by the request, wherein the Web entity under test is implemented on another system remote, over the network, to the system implementing the Web resource validation service;
receive a remote service response to the remote service request from the Web entity under test;
validate the remote service response in accordance with validation requirements for the remote service response specified in the request received from the client or in another request; and
return results of said validation in a response to the client system, wherein said response is formatted in accordance with a response schema for responses from the Web resource validation service.

2. The system as recited in claim 1, wherein the request specifies the Web entity under test, one or more remote service requests for the Web entity under test, and validation requirements for remote service responses to the one or more remote service requests in accordance with the request schema.

3. The system as recited in claim 1, wherein the validation requirements specify an expected value for a field in the remote service response, and wherein, to validate the remote service response, the Web resource validation service is configured to test the value of the field in the remote service response against the specified expected value.

4. The system as recited in claim 1, wherein the remote service request comprises a request for the Web entity under test to return a service description for the Web entity under test, and wherein, to validate the remote service response, the Web resource validation service is configured to compare the service description returned in the remote service response to an expected service description for the Web entity under test specified in the request received from the client system.

5. The system as recited in claim 4, wherein the Web entity under test is a Web service, and wherein the service description is a Web Services Description Language (WSDL) description.

6. The system as recited in claim 1, wherein, for each of one or more fields in the remote service response, the validation requirements specify that the field is to be validated in accordance with one or more of:
   an exact match of a value in the field to an expected value specified for the field in the validation requirements, wherein the validation for the field passes if an exact match is found and fails if an exact match is not found;
   a match of the value in the field to a regular expression specified for the field in the validation requirements, wherein the validation for the field passes if a match to the regular expression is found and fails if a match to the regular expression is not found;
   the field is present and populated, wherein the validation for the field passes if the field is present and populated and fails otherwise;
   the field is present but not populated, wherein the validation for the field passes if the field is present and not populated and fails otherwise;
   the field is present, wherein the validation for the field passes if the field is present and fails otherwise; and
   the field is not present, wherein the validation for the field passes if the field is not present and fails otherwise.

7. The system as recited in claim 1, wherein the Web entity under test is a Web service, wherein the remote service request is a Web services call to the Web entity under test in accordance with a Web services application programming interface (API) for the Web entity under test, and wherein, to validate the remote service response, the Web resource validation service is configured to validate that the remote service response comprises expected results for the Web services call.

8. The system as recited in claim 1, wherein the remote service request is a call to the Web entity under test in accordance with an interface to the Web entity under test and requesting content of the Web entity under test, and wherein, to validate the remote service response, the Web resource validation service is configured to validate that the content of the remote service response corresponds to expected content for a remote service response to the call to the Web entity under test as specified in the request received from the client.

9. The system as recited in claim 1, wherein the Web resource validation service is a Web service, and wherein the request is sent from the client system to the Web resource validation service as a Web services call to a Web services application programming interface (API) of the Web resource validation service.

10. The system as recited in claim 1, wherein the request is configured to be sent from the client system to the Web resource validation service via a network.

11. The system as recited in claim 10, wherein the network is the Internet.

12. The system as recited in claim 1, wherein the request schema and the response schema are implemented in accordance with a markup language.

13. The system as recited in claim 12, wherein the markup language is eXtensible Markup Language (XML).

14. The system as recited in claim 1, wherein, to send a remote service request specified by the request to a Web entity under test specified by the request, the Web resource validation service is configured to send the remote service request to the Web entity under test in accordance with Fully REpresentational State Transfer (REST).

15. The system as recited in claim 1, wherein, to send a remote service request specified by the request to a Web entity under test specified by the request, the Web resource validation service is configured to send the remote service request to the Web entity under test in accordance with Simple Object Access Protocol (SOAP).

16. The system as recited in claim 1, wherein the Web resource validation service is configured to send remote service requests to the Web entity under test in accordance with Simple Object Access Protocol (SOAP) and in accordance with Fully REpresentational State Transfer (REST), and wherein the request received from the client system specifies whether SOAP or REST is to be used to send the remote service request specified by the request to the Web entity under test.

17. The system as recited in claim 1, wherein, to return results of said validation in a response to the client system, the Web resource validation service is configured to return one or more of information on fields in the remote service response that failed validation, information on fields in the remote service response that passed validation, and information on fields in the remote service response that passed or failed validation as specified by the request.

18. The system as recited in claim 1, wherein the Web resource validation service is further configured to return the complete remote service response in the response as specified by the request.

19. The system as recited in claim 1, wherein the Web resource validation service is further configured to:
   cache the remote service response; and
   use one or more field values from the cached remote service response as input parameter values to a subsequent remote service request to the Web entity under test as specified by the request.

20. The system as recited in claim 1, wherein the Web resource validation service is further configured to:
   cache the remote service response; and
   use one or more field values from the cached remote service response as input values to validate a subsequent remote service response from the Web entity under test as specified by the request.

21. The system as recited in claim 1, wherein, to validate the remote service response in accordance with validation requirements for the remote service response specified in the request received from the client, the Web resource validation service is further configured to parse the remote service response using XPath to locate fields and values of said fields in the remote service response.

22. The system as recited in claim 1, wherein the Web resource validation service is further configured to provide XPath support for the client system to use XPath expressions to reference portions of eXtensible Markup Language (XML) content of the remote service response without the client system having its own XPath support.

23. The system as recited in claim 22, wherein, to validate the remote service response, the Web resource validation service is further configured to use XPath expressions specified in the request received from the client system to reference portions of XML content of the remote service response.

24. A method for validating Web resources, comprising:
a Web service receiving a request from a client system, wherein the request is formatted in accordance with a request schema for requests to the Web service;
in response to the request from the client system:
the Web service sending, via a network, a remote service request specified by the request to a remote Web entity under test specified by the request, wherein the Web entity under test is implemented on a different system than the Web service, wherein the different system implementing the Web entity under test is remote, over the network, to the system implementing the Web service;
the Web service receiving a remote service response to the remote service request from the Web entity under test;
the Web service validating the remote service response in accordance with validation requirements for the remote service response specified in the request or in another request; and
the Web service returning results of said validation in a response to the client system, wherein said response is formatted in accordance with a response schema for responses from the Web service.

25. The method as recited in claim 24, wherein the request specifies the Web entity under test, one or more remote service requests for the Web entity under test, and validation requirements for remote service responses to the one or more remote service requests in accordance with the request schema.

26. The method as recited in claim 24, wherein the validation requirements specify an expected value for a field in the remote service response, and wherein said validating the remote service response comprises testing the value of the field in the remote service response against the specified expected value.

27. The method as recited in claim 24, wherein the remote service request requests the Web entity under test to return a service description for the Web entity under test, and wherein said validating the remote service response comprises the Web service comparing the service description in the remote service response to an expected service description for the Web entity under test specified in the request received from the client system.

28. The method as recited in claim 27, wherein the Web entity under test is a Web service, and wherein the service description is a Web Services Description Language (WSDL) description.

29. The method as recited in claim 24, wherein, for each of one or more fields in the remote service response, said validating the remote service response comprises the Web service validating the field in accordance with one or more of, as specified in the validation requirements for the field:
an exact match of a value in the field to an expected value specified for the field in the validation requirements, wherein the validation for the field passes if an exact match is found and fails if an exact match is not found;
a match of the value in the field to a regular expression specified for the field in the validation requirements, wherein the validation for the field passes if a match to the regular expression is found and fails if a match to the regular expression is not found;
the field is present and populated, wherein the validation for the field passes if the field is present and populated and fails otherwise;
the field is present but not populated, wherein the validation for the field passes if the field is present and not populated and fails otherwise;
the field is present, wherein the validation for the field passes if the field is present and fails otherwise; and
the field is not present, wherein the validation for the field passes if the field is not present and fails otherwise.

30. The method as recited in claim 24, wherein the Web service is a Web resource validation service configured to validate other Web services, wherein the Web entity under test is a Web service, wherein the remote service request is a Web services call to the Web entity under test in accordance with a Web services application programming interface (API) for the Web entity under test, and wherein said validating the remote service response comprises the Web resource validation service validating that the remote service response comprises expected results for the Web services call.

31. The method as recited in claim 24, wherein the remote service request is a call to the Web entity under test in accordance with an interface to the Web entity under test and requesting content of the Web entity under test, and wherein, to validate the remote service response, the Web resource validation service is configured to validate that the content of the remote service response corresponds to expected content for a remote service response to the call to the Web entity under test as specified in the request received from the client.

32. The method as recited in claim 24, further comprising the client system sending the request to the Web service via a network.

33. The method as recited in claim 32, wherein the network is the Internet.

34. The method as recited in claim 24, wherein the request schema and the response schema are implemented in accordance with a markup language.

35. The method as recited in claim 34, wherein the markup language is eXtensible Markup Language (XML).

36. The method as recited in claim 24, wherein, in said sending a remote service request specified by the request to a Web entity under test specified by the request, the Web service is configured to send the remote service request to the Web entity under test in accordance with Fully REpresentational State Transfer (REST).

37. The method as recited in claim 24, wherein, in said sending a remote service request specified by the request to a Web entity under test specified by the request, the Web service is configured to send the remote service request to the Web entity under test in accordance with Simple Object Access Protocol (SOAP).

38. The method as recited in claim 24, wherein the Web service is configured to send remote service requests to the Web entity under test in accordance with Simple Object Access Protocol (SOAP) and in accordance with Fully REpresentational State Transfer (REST), and wherein the request received from the client system specifies whether SOAP or REST is to be used in said a remote service request specified by the request to a Web entity under test.

39. The method as recited in claim 24, wherein said returning results of said validation in a response to the client system comprises returning one or more of information on fields in the remote service response that failed validation, information on fields in the remote service response that passed validation, and information on fields in the remote service response that passed or failed validation as specified by the request.

40. The method as recited in claim 24, further comprising the Web service returning the complete remote service response in the response as specified by the request.

41. The method as recited in claim 24, further comprising:
the Web service caching the remote service response; and
the Web service using one or more field values from the cached remote service response as input parameter values to a subsequent remote service request to the Web entity under test as specified by the request.

42. The method as recited in claim 24, further comprising:
the Web service caching the remote service response; and
the Web service using one or more field values from the cached remote service response as input values to validate a subsequent remote service response from the Web entity under test as specified by the request.

43. The method as recited in claim 24, wherein said validating the remote service response in accordance with validation requirements for the remote service response specified in the request comprises the Web service parsing the remote service response using XPath to locate fields and values of said fields in the remote service response.

44. The method as recited in claim 24, wherein the Web service is further configured to provide XPath support for the client system to use XPath expressions to reference portions of eXtensible Markup Language (XML) content of the remote service response without the client system having its own XPath support.

45. The method as recited in claim 44, wherein said validating the remote service response comprises using XPath expressions specified in the request received from the client system to reference portions of XML content of the remote service response.

46. A non-transitory computer-accessible storage medium storing program instructions that when executed by a computer cause the computer to implement a Web resource validation service configured to:
receive a request from a client system, wherein the request is formatted in accordance with a request schema for requests to the Web resource validation service;
in response to the request from the client system:
send, via a network, a remote service request specified by the request to a remote Web entity under test specified by the request, wherein the Web entity under test is implemented on a different system than the Web resource validation service, wherein the different system implementing the Web entity under test is remote, over the network, to the system implementing the Web resource validation service;
receive a remote service response to the remote service request from the Web entity under test;
validate the remote service response in accordance with validation requirements for the remote service response specified in the request or in another request; and
return results of said validation in a response to the client system, wherein said response is formatted in accordance with a response schema for responses from the Web resource validation service.

47. The non-transitory computer-accessible storage medium as recited in claim 46, wherein the request specifies the Web entity under test, one or more remote service requests for the Web entity under test, and validation requirements for remote service responses to the one or more remote service requests in accordance with the request schema.

48. The non-transitory computer-accessible storage medium as recited in claim 46, wherein the validation requirements specify an expected value for a field in the remote service response, and wherein, to validate the remote service response, the Web resource validation service is configured to test the value of the field in the remote service response against the specified expected value.

49. The non-transitory computer-accessible storage medium as recited in claim 46, wherein the remote service request comprises a request for the Web entity under test to return a service description for the Web entity under test, and wherein, to validate the remote service response, the Web resource validation service is configured to compare the service description returned in the remote service response to an expected service description for the Web entity under test specified in the request received from the client system.

50. The non-transitory computer-accessible storage medium as recited in claim 49, wherein the Web entity under test is a Web service, and wherein the service description is a Web Services Description Language (WSDL) description.

51. The non-transitory computer-accessible storage medium as recited in claim 46, wherein, for each of one or more fields in the remote service response, the validation requirements specify that the field is to be validated in accordance with one or more of:
an exact match of a value in the field to an expected value specified for the field in the validation requirements, wherein the validation for the field passes if an exact match is found and fails if an exact match is not found;
a match of the value in the field to a regular expression specified for the field in the validation requirements, wherein the validation for the field passes if a match to the regular expression is found and fails if a match to the regular expression is not found;
the field is present and populated, wherein the validation for the field passes if the field is present and populated and fails otherwise;
the field is present but not populated, wherein the validation for the field passes if the field is present and not populated and fails otherwise;
the field is present, wherein the validation for the field passes if the field is present and fails otherwise; and
the field is not present, wherein the validation for the field passes if the field is not present and fails otherwise.

52. The non-transitory computer-accessible storage medium as recited in claim 46, wherein the Web entity under test is a Web service, wherein the remote service request is a Web services call to the Web entity under test in accordance with a Web services application programming interface (API) for the Web entity under test, and wherein, to validate the remote service response, the Web resource validation service is configured to validate that the remote service response comprises expected results for the Web services call.

53. The non-transitory computer-accessible storage medium as recited in claim 46, wherein the remote service request is a call to the Web entity under test in accordance with an interface to the Web entity under test and requesting content of the Web entity under test, and wherein, to validate the remote service response, the Web resource validation service is configured to validate that the content of the remote service response corresponds to expected content for a remote service response to the call to the Web entity under test as specified in the request received from the client.

54. The non-transitory computer-accessible storage medium as recited in claim 46, wherein the Web resource validation service is a Web service, and wherein the request is sent from the client system to the Web resource validation service as a Web services call to a Web services application programming interface (API) of the Web resource validation service.

55. The non-transitory computer-accessible storage medium as recited in claim 46, wherein the request is sent from the client system to the Web resource validation service via a network.

56. The non-transitory computer-accessible storage medium as recited in claim 55, wherein the network is the Internet.

57. The non-transitory computer-accessible storage medium as recited in claim 46, wherein the request schema and the response schema are implemented in accordance with a markup language.

58. The non-transitory computer-accessible storage medium as recited in claim 57, wherein the markup language is eXtensible Markup Language (XML).

59. The non-transitory computer-accessible storage medium as recited in claim 46, wherein, to send a remote service request specified by the request to a Web entity under test specified by the request, the Web resource validation service is configured to send the remote service request to the Web entity under test in accordance with Fully REpresentational State Transfer (REST).

60. The non-transitory computer-accessible storage medium as recited in claim 46, wherein, to send a remote service request specified by the request to a Web entity under test specified by the request, the Web resource validation service is configured to send the remote service request to the Web entity under test in accordance with Simple Object Access Protocol (SOAP).

61. The non-transitory computer-accessible storage medium as recited in claim 46, wherein the Web resource validation service is configured to send remote service requests to the Web entity under test in accordance with Simple Object Access Protocol (SOAP) and in accordance with Fully REpresentational State Transfer (REST), and wherein the request received from the client system specifies whether SOAP or REST is to be used to send the remote service request specified by the request to the Web entity under test.

62. The non-transitory computer-accessible storage medium as recited in claim 46, wherein, to return results of said validation in a response to the client system, the Web resource validation service is configured to return one or more of information on fields in the remote service response that failed validation, information on fields in the remote service response that passed validation, and information on fields in the remote service response that passed or failed validation as specified by the request.

63. The non-transitory computer-accessible storage medium as recited in claim 46, wherein the Web resource validation service is further configured to return the complete remote service response in the response as specified by the request.

64. The non-transitory computer-accessible storage medium as recited in claim 46, wherein the Web resource validation service is further configured to:
   cache the remote service response; and
   use one or more field values from the cached remote service response as input parameter values to a subsequent remote service request to the Web entity under test as specified by the request.

65. The non-transitory computer-accessible storage medium as recited in claim 46, wherein the Web resource validation service is further configured to:
   cache the remote service response; and
   use one or more field values from the cached remote service response as input values to validate a subsequent remote service response from the Web entity under test as specified by the request.

66. The non-transitory computer-accessible storage medium as recited in claim 46, wherein, to validate the remote service response in accordance with validation requirements for the remote service response specified in the request, the Web resource validation service is further configured to parse the remote service response using XPath to locate fields and values of said fields in the remote service response.

67. The non-transitory computer-accessible storage medium as recited in claim 46, wherein the Web resource validation service is further configured to provide XPath support for the client system to use XPath expressions to reference portions of eXtensible Markup Language (XML) content of the remote service response without the client system having its own XPath support.

68. The non-transitory computer-accessible storage medium as recited in claim 67, wherein, to validate the remote service response, the Web resource validation service is further configured to use XPath expressions specified in the request received from the client system to reference portions of XML content of the remote service response.

69. A network system, comprising:
   a client system coupled to a network and configured to host a client application;
   a computer system coupled to the network and implementing a Web entity server configured to host a Web entity; and
   a different computer system coupled to the network and implementing a Web resource validation server configured to host a Web resource validation service, wherein the Web resource validation service is configured to:
      receive a request from the client application via the network, wherein the request is formatted in accordance with a request schema for requests to the Web resource validation service;
      send, via the network, a remote service request specified by the request to the Web entity as specified by the request;
      receive a remote service response to the remote service request from the Web entity;
      validate the remote service response in accordance with validation requirements for the remote service response specified in the request; and
      return results of said validation in a response to the client application via the network, wherein said response is formatted in accordance with a response schema for responses from the Web resource validation service.

70. The network system as recited in claim 69, wherein the Web entity under test is a Web service, wherein the remote service request is a Web services call to the Web entity under test in accordance with a Web services application programming interface (API) for the Web entity under test, and wherein, to validate the remote service response, the Web resource validation service is configured to validate that the remote service response comprises expected results for the Web services call.

71. The network system as recited in claim 69, wherein the remote service request is a call to the Web entity under test in accordance with an interface to the Web entity under test and requesting content of the Web entity under test, and wherein, to validate the remote service response, the Web resource validation service is configured to validate that the content of the remote service response corresponds to expected content for a remote service response to the call to the Web entity under test as specified in the request received from the client.

* * * * *